(12) United States Patent
Suzuki et al.

(10) Patent No.: US 11,556,570 B2
(45) Date of Patent: Jan. 17, 2023

(54) EXTRACTION OF SEMANTIC RELATION

(71) Applicant: INTERNATIONAL BUSINESS MACHINES CORPORATION, Armonk, NY (US)

(72) Inventors: Shoko Suzuki, Kanagawa-ken (JP); Tetsuya Nasukawa, Kanagawa-ken (JP); Hiroshi Kanayama, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 16/137,109

(22) Filed: Sep. 20, 2018

(65) Prior Publication Data
US 2020/0097596 A1 Mar. 26, 2020

(51) Int. Cl.
*G06F 15/16* (2006.01)
*G06F 16/31* (2019.01)
(Continued)

(52) U.S. Cl.
CPC .......... *G06F 16/313* (2019.01); *G06F 16/322* (2019.01); *G06F 16/335* (2019.01); *G06F 16/355* (2019.01)

(58) Field of Classification Search
CPC .... G06F 16/313; G06F 16/322; G06F 16/335; G06F 16/355
See application file for complete search history.

(56) References Cited

U.S. PATENT DOCUMENTS

| 7,899,666 B2 | 3/2011 | Varone |
| 2003/0217335 A1* | 11/2003 | Chung ............... G06F 16/355 |
| | | 715/206 |

(Continued)

FOREIGN PATENT DOCUMENTS

| CN | 105808525 A | 7/2016 |
| CN | 106569993 A | 4/2017 |
| JP | 2015-088333 | 5/2015 |

OTHER PUBLICATIONS

Parapatics et al. Patent Claim Decomposition for Improved Information Extraction. PaIR 2009. pp. 33-36. (Year: 2009).*

(Continued)

*Primary Examiner* — Alex Gofman
*Assistant Examiner* — Shelly X Qian
(74) *Attorney, Agent, or Firm* — Tutunjian & Bitetto, P.C.; Randy Emilio Tejeda

(57) ABSTRACT

A computer-implemented method for extracting semantic relations is disclosed. In the method, a plurality of hierarchal structures that originates from a corpus of documents is obtained. Each hierarchal structure includes a plurality of elements having respective recitations included in a corresponding document. In the method, for each predetermined relationship between ancestor and descendant elements in the hierarchal structures, a first keyword list is extracted from the ancestor element and a second keyword list is extracted from the descendant element. A statistical index is calculated for each pair of first and second keywords using the first keyword lists and the second keyword lists. The index indicates a strength of association between the first and second keywords. In the method, a candidate list of keyword pairs having semantic relationships is output using the statistical index calculated for each pair.

19 Claims, 11 Drawing Sheets

(51) Int. Cl.
*G06F 16/335* (2019.01)
*G06F 16/35* (2019.01)

(56) References Cited

U.S. PATENT DOCUMENTS

2008/0275694 A1* 11/2008 Varone .................... G06F 40/30
704/9
2017/0351662 A1 12/2017 Suzuki et al.

OTHER PUBLICATIONS

Joung et al. Monitoring emerging technologies for technology planning using technical keyword based analysis from patent data. Technological Forecasting & Social Change 114 (2017) pp. 281-292. (Year: 2017).*

Lin et al. The Study of Patent Prior Art Retrieval Using Claim Structure and Link Analysis. PACIS 2010, pp. 1953-1962. (Year: 2010).*

Yamada et al. Hypernym Discovery Based on Distributional Similarity and Hierarchical Structures. Proceedings of the 2009 Conference on Empirical Methods in Natural Language Processing, pp. 929-937. (Year: 2009).*

Andersson et al. Insight to Hyponymy Lexical Relation Extraction in the Patent Genre Versus Other Text Genres. IPAMIN 2014, pp. 1-7. (Year: 2014).*

Suzuki, Shoko, et al. "Extraction of keywords of novelties from patent claims," Proceedings of COLING 2016, the 26th International Conference on Computational Linguistics: Technical Papers, Dec. 2016, pp. 1192-1200.

Shinmori, Akihiro, et al. "Patent claim processing for readability: structure analysis and term explanation," Proceedings of the ACL-2003 workshop on Patent corpus processing, Association for Computational Linguistics, Jul. 2003, pp. 56-65, vol. 20.

Sheremetyeva, Svetlana, et al. "Generating patent claims from interactive input," Eighth International Natural Language Generation Workshop, 1996, 10 pages.

Parapatics, Peter, et al. "Patent claim decomposition for improved information extraction," Current Challenges in Patent Information Retrieval, 2011, 4 pages.

Namba, Eiji, et al. "Automatic Construction of Thesaurus," 2011, http://www.japio.or.jp/00yearbook/files/2011book/11_4_07.pdf.

* cited by examiner

1. A carbon coating layer provided on a current collector, wherein unevenness due to the carbon material is provided on the side coming into contact with the active material.

2. A paint used for preparing a carbon coat layer, comprising a carbon material, wherein the unevenness due to the carbon material is formed on the side coming into contact with the active material by coating on the current collector.

3. The carbon coating layer according to claim 1, or the paint according to claim 2, wherein the height of the unevenness is 0.5 to 4.0 μm.

4. The carbon coating layer according to claim 1 or 3, or the paint according to claim 2 or 3, wherein the carbon material is at least one selected from the group consisting of carbon black, graphite and carbon nanotubes.

5. The carbon coating layer according to any one of claims 1, 3 and 4 or the paint according to any one of claims 2 to 4, wherein the carbon materials having different granularity are combined.

6. The carbon coating layer or paint according to claim 5, wherein the carbon material is combined at a weight ratio of A: B = 100: 10 to 300 where A represents carbon black having granularity of 300 to 700 nm in average particle size and B represents carbon black having granularity of 800 to 1500 nm in average particle size.

FIG. 4

EXTRACTED PARENT-CHILD RELATIONS

601a

| | |
|---|---|
| ~~carbon material; unevenness; active material; contact~~ | ~~unevenness; height; μm~~ |
| carbon material; ~~unevenness; active material; contact~~ | carbon material; carbon black; graphite; carbon nanotubes |
| carbon material; ~~unevenness; active material; contact~~ | carbon material; ~~different; granularity;~~ combine |
| carbon material; ~~different;~~ granularity; ~~combine~~ | carbon material; average, particle size, ~~granularity;~~ carbon black; nm, weight ratio |

603a

METHODOLOGY-1

EXTRACTED PARENT-CHILD RELATIONS

601b

| | |
|---|---|
| carbon material; unevenness; active material; contact | ~~unevenness; height; μm~~ |
| carbon material; unevenness; active material; contact | ~~carbon material;~~ carbon black; graphite; carbon nanotubes |
| carbon material; unevenness; active material; contact | ~~carbon material; different;~~ granularity; combine |
| carbon material; different; granularity; combine | ~~carbon material;~~ average, particle size, ~~granularity;~~ carbon black; nm, weight ratio |

603b

METHODOLOGY-2

FIG. 6

| Selection | Hypernym | Hyponym | PMI | Multiple Doc. | Node Share |
|---|---|---|---|---|---|
| ☐ | electrolytes | styrene sulfonic acid ethyl | 2.0 | ★ | |
| ☐ | electrolytes | lithium tetraphenylborate | 1.8 | | |
| ✓ | electrolytes | transition metal salt | 1.6 | ★ | ◯ |
| ✓ | electrolytes | lithium hexafluorophosphate | 1.3 | ★ | ◯ |

FIG. 7

HYPONYMS OF "金属(metal)"

| CANDIDATES | INDEX | FREQUENCY |
|---|---|---|
| オスミウム(osmium) | 18.48117615 | 36 |
| Au | 17.85116792 | 111 |
| Ag | 16.25962601 | 162 |
| イリジウム(iridium) | 15.69283329 | 66 |
| Ir | 15.23770269 | 67 |
| Pd | 14.51254069 | 120 |
| Pt | 14.33296389 | 147 |
| タンタル(tantalum) | 14.14918116 | 71 |
| Ru | 13.866432 | 118 |
| Rh | 13.10774258 | 75 |
| ニオブ(niobium) | 12.5572719 | 66 |
| ロジウム(rhodium) | 12.37228512 | 66 |
| 亜鉛(zinc) | 12.09654031 | 139 |
| 金(gold) | 12.06311244 | 104 |
| Pb | 11.9932176 | 70 |
| 銀(silver) | 11.69514286 | 121 |
| 銅(copper) | 11.58571902 | 271 |
| パラジウム(palladium) | 11.58233919 | 101 |
| タングステン(tungsten) | 11.53025597 | 82 |
| Ge | 11.5087223 | 116 |
| 鉄(iron) | 11.40204148 | 238 |
| ルテニウム(ruthenium) | 11.37719998 | 87 |
| Cd | 10.8513653 | 31 |
| アルミニウム(aluminum) | 10.79060221 | 285 |
| Zn | 10.65913085 | 161 |
| 合金(alloy) | 10.61879876 | 244 |
| Cu | 10.38479054 | 210 |
| ニッケル(nickel) | 9.596796595 | 203 |
| Sn | 9.391072107 | 155 |
| 錫(tin) | 9.338153926 | 44 |

| CANDIDATES | INDEX | FREQUENCY |
|---|---|---|
| ジルコニウム(zirconium) | 8.882909426 | 62 |
| モリブデン(molybdenum) | 8.878150069 | 69 |
| Fe | 8.799155953 | 234 |
| Ta | 8.64161366 | 67 |
| チタン(titanium) | 8.529851017 | 144 |
| 白金(platinum) | 8.344452358 | 140 |
| In | 8.341772646 | 70 |
| アンチモン(antimony) | 8.292605834 | 30 |
| Ni | 7.728006854 | 252 |
| Tl | 7.706862443 | 184 |
| マグネシウム(magnesium) | 7.669161217 | 75 |
| スズ(tin) | 7.598672095 | 69 |
| コバルト(cobalt) | 7.581952289 | 136 |
| Sb | 7.210869383 | 42 |
| Bi | 7.203534762 | 44 |
| Cr | 6.965819034 | 127 |
| Al | 6.9655832018 | 214 |
| Co | 6.946550977 | 181 |
| バナジウム(vanadium) | 6.855747401 | 51 |
| Ge | 6.723626786 | 55 |
| Nb | 6.308116082 | 77 |
| インジウム(indium) | 6.196926313 | 32 |
| Mo | 6.013928319 | 77 |
| Mg | 5.956691202 | 106 |
| アルミニウム合金(aluminum alloy) | 5.768809612 | 36 |
| Zr | 5.639954231 | 86 |
| 含素(content) | 5.635826695 | 31 |
| Si | 5.225327646 | 104 |
| Ca | 5.044030841 | 57 |
| ステンレス鋼(stainless steel) | 5.024532896 | 35 |

FIG. 8

| HYPONYMS OF "樹脂(resin)" | | |
|---|---|---|
| CANDIDATES | INDEX | FREQUENCY |
| ポリアミドイミド樹脂 (polyamideimide resin) | 38.27808253 | 15 |
| エポキシ系樹脂 (epoxy-based resin) | 36.03507344 | 17 |
| 熱硬化性樹脂 (thermosetting resin) | 33.09319586 | 69 |
| ポリアミド樹脂 (polyamide resin) | 31.14804696 | 25 |
| アクリル樹脂 (acrylic resin) | 28.12703248 | 39 |
| エポキシ樹脂 (epoxy resin) | 25.79196635 | 65 |
| フェノール樹脂 (phenolic resin) | 25.24449417 | 55 |
| ウレタン樹脂 (urethane resin) | 22.75235307 | 15 |
| ポリブチレンテレフタレート (polybutylene terephthalate) | 19.27953435 | 22 |
| フッ素系樹脂 (fluorine-containing) | 16.24512702 | 28 |
| ポリイミド樹脂 (polyimide resin) | 15.15985124 | 19 |
| フッ素樹脂 (fluorine resin) | 14.56368818 | 49 |
| ポリオレフィン樹脂 (polyolefin) | 14.46433069 | 20 |
| ポリエチレンナフタレート (polyethylene naphthalate) | 14.27368873 | 15 |
| 硬化 (curing) | 14.11449708 | 23 |
| ポリスチレン (polystyrene) | 13.65301076 | 35 |
| 熱可塑性樹脂 (thermoplastic resin) | 13.54437403 | 47 |
| ポリエチレン (polyethylene) | 12.91650152 | 89 |
| ポリエチレンテレフタレート (polyethylene terephthalate) | 12.75984492 | 34 |
| ポリウレタン (polyurethane) | 12.39133644 | 23 |
| ポリカーボネート (polycarbonate) | 11.63574548 | 23 |
| ポリアミド (polyamide) | 11.05841883 | 37 |
| ポリプロピレン樹脂 (polypropylene resin) | 10.96598471 | 15 |
| ポリアミドイミド (polyamidimide) | 10.85339653 | 23 |
| ポリプロピレン (polypropylene) | 10.50189468 | 76 |

| CANDIDATES | INDEX | FREQUENCY |
|---|---|---|
| 射出成形 (injection molding) | 9.92842316 | 15 |
| エチレン (ethylene) | 9.66146536 | 48 |
| ナイロン (nylon) | 9.62680137S | 16 |
| ポリフェニレンサルファイド (polyphenylene sulfide) | 9.61347798 | 18 |
| 共重合体 (copolymer) | 9.01324622 | 68 |
| ガラス転移温度 (glass transition temperature) | 8.96491518 | 20 |
| ビニリデン (vinylidene) | 8.95513068 | 23 |
| ポリオレフィン系樹脂 (polyolefin-based resin) | 8.67645295 | 17 |
| 固化する (solidification) | 8.52958656 | 14 |
| 共重合 (copolymerization) | 7.88494795 | 15 |
| 融点 (melting point) | 7.88221524S | 52 |
| ポリフッ化ビニリデン (polyvinylidene fluoride) | 7.63583870S | 41 |
| ポリビニルアルコール (polyvinyl alcohol) | 7.62094644 | 30 |
| 重合体 (polymer) | 6.71838425 | 31 |
| ポリテトラフルオロエチレン (polytetrafluoroethylene) | 6.69351963 | 35 |
| ポリイミド (polyimide) | 6.62078705 | 39 |
| 硬化 (cure) | 6.54158566 | 23 |
| 架橋する (crosslink) | 6.49710435 | 18 |
| 重量平均分子量 (weight-average molecular weight) | 5.89735424 | 18 |
| 質量部 (mass part) | 5.71051058 | 37 |
| 溶剤 (solvent) | 5.56680885 | 22 |
| ポリオレフィン (polyolefine) | 5.43048913 | 24 |
| テトラフルオロエチレン (tetrafluoroethylene) | 5.21179110 | 15 |

FIG. 9

| HYPONYMS OF "グラファイト(graphite)" | INDEX | FREQUENCY |
|---|---|---|
| インターカレーション(intercalation) | 134.7356 | 5 |
| ウェイト(weight) | 103.804 | 6 |
| 炭素粉末(carbon powder) | 69.94171 | 19 |
| 導電性粒子(conductive particles) | 68.37628 | 6 |
| アノード材料(anode material) | 56.36834 | 6 |
| ホウ化バナジウム(vanadium boride) | 50.68666 | 3 |
| 方性((an)isotropic) | 50.30891 | 10 |
| カーボン材料(carbon material) | 47.53825 | 11 |
| 導電性粉末剤(conductive additives) | 41.80544 | 4 |
| 炭素質材料(carbonaceous material) | 37.6657 | 32 |
| カーボンナノファイバ(carbon nano-fiber) | 37.24517 | 8 |
| カーボン基材(carbon substrate) | 35.73083 | 4 |
| アンチモナイド(antimonaide) | 34.08047 | 4 |
| 活性材料(active material) | 28.06616 | 9 |
| 炭素系材料(carbon-based material) | 27.65148 | 9 |
| 導電性カーボン(conductive carbon) | 26.00134 | 8 |
| 活性物質(active substance) | 22.63444 | 6 |
| 密閉形鉛蓄電池(valve regulated lead acid battery) | 20.13553 | 4 |
| アノード活物質(anode active material) | 17.71932 | 4 |
| 炭素材料(carbon material) | 16.80561 | 40 |
| リチウム化(lithiation) | 15.85669 | 3 |

| CANDIDATES | INDEX | FREQUENCY |
|---|---|---|
| 導電性炭素材料(conductive carbon material) | 15.01912 | 6 |
| 酸素還元触媒(oxygen-reducing catalyst) | 14.6093 | 6 |
| 導電性フィラー(conductive filler) | 14.20692 | 8 |
| 微細(fine) | 13.3952 | 8 |
| 水電解液二次電池用(aqueous electrolyte secondary battery use) | 12.10661 | 4 |
| 導電性材料(conductive material) | 11.3236 | 12 |
| カーボン(carbon) | 11.24639 | 18 |
| 繊維材料(fiber material) | 10.97937 | 3 |
| 炭素(carbon) | 10.47086 | 36 |
| 交流電流(alternating current) | 10.25699 | 4 |
| 金属M(metal M) | 9.979776 | 4 |
| 電極活物質(electrode active material) | 9.07457 | 16 |
| 水素貯蔵体(hydrogen storage) | 8.580337 | 3 |
| 混合物(mixture) | 8.425552 | 26 |
| 鱗片状(flaky) | 8.297791 | 4 |
| 元素(element) | 7.777847 | 11 |
| カーボン粒子(carbon particle) | 7.079495 | 6 |
| アミノ基(amino group) | 6.901901 | 4 |
| フッ素化(fluorination) | 6.419943 | 5 |
| 充填材(filler) | 6.087293 | 6 |
| フィラー(filler) | 5.739448 | 6 |
| 窒素原子(nitrogen atom) | 5.724833 | 4 |
| 交流電圧(ac voltage) | 5.680796 | 4 |
| 発泡(foaming) | 5.16436 | 4 |
| アノード(anode) | 5.124013 | 18 |

FIG. 10

EXTRACTION OF SEMANTIC RELATION

BACKGROUND

Technical Field

The present disclosure, generally, relates to semantic relation extraction, more particularly, to techniques for extracting semantic relation from a corpus of documents.

Description of the Related Art

Semantic relation such as hypernym/hyponym relation is key information for various analysis tasks, including prior art search and patent map creation, etc. There are many thesauri covering the hypernym/hyponym relation and other semantic relation. However, the existing thesauri are not always applicable to patent analysis since highly technical contents are generally described in patent documents with patent-specific words and phrases that may not be covered in the existing thesauri. Especially, the hypernym/hyponym relation may change depending on technical fields. Furthermore, although such semantic relation is often defined in documents, the relation is not always rigidly described in a form such as "is-a" expression in the documents.

Therefore, there is a need for developing novel technology capable of extracting semantic relation from a given corpus of documents while reducing manual work.

SUMMARY

According to an embodiment of the present invention, a computer-implemented method for extracting semantic relation is provided. The method includes obtaining a plurality of hierarchal structures originating from a corpus of documents. Each hierarchal structure includes a plurality of elements having respective recitations that are included in a corresponding document. The method also includes extracting, for each predetermined relation between ancestor and descendant elements in the hierarchal structures, a first keyword list from the ancestor element and a second keyword list from the descendant element. The method further includes calculating, for each pair of first and second keywords, a statistical index indicating strength of association between the first and second keywords, using a first keyword lists and the second keyword lists. The method includes further outputting a candidate list of keyword pairs having semantic relation using the statistical index calculated for each pair.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 4 depicts an example of a series of patent claims as an input for a hypernym-hyponym extraction according to the exemplary embodiment of the present invention;

FIG. 6 depicts schematics of ways of extracting parent and child keywords from recitations of claim elements during the hypernym-hyponym extraction according to the exemplary embodiment of the present invention;

FIG. 7 illustrates a schematic of a graphical user interface displaying a result of hypernym-hyponym relation extraction according to an exemplary embodiment of the present invention;

FIG. 8 shows an example of a candidate list obtained experimentally by performing the extraction process using a patent claim section of patent specifications having IPC=H01M according to an exemplary embodiment of the present invention;

FIG. 9 shows other example of a candidate list obtained experimentally by performing the extraction process using the patent claim section of the patent specifications having IPC=H01M according to an exemplary embodiment of the present invention;

FIG. 10 shows another example of a candidate list obtained experimentally by performing the extraction process using the patent claim section of the patent specifications having IPC=H01M according to an exemplary embodiment of the present invention.

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for extracting semantic relation from a corpus of documents. In particular embodiments the semantic relation to be extracted may be hypernym-hyponym relation and the corpus of the documents under analysis may be a corpus of patent documents, including a patent claim section in a patent specification.

Hereinafter, referring to a series of FIGS. 1-7, a computer system and a method for extracting hypernym-hyponym relation from a given corpus of patent documents according to an exemplary embodiment of the present invention will be described. Then, referring to a series of FIGS. 8-10, experimental studies on the novel hypernym-hyponym relation extraction according to the exemplary embodiment of the present invention will be described. Finally, referring to FIG.

11, a hardware configuration of a computer system according to one or more embodiments of the present invention will be described.

Exemplary Embodiment

Now, referring to a series of FIGS. 1-7, a hypernym-hyponym extraction system and a method for extracting hypernym-hyponym relation from a corpus of patent documents are described.

Figure 1:
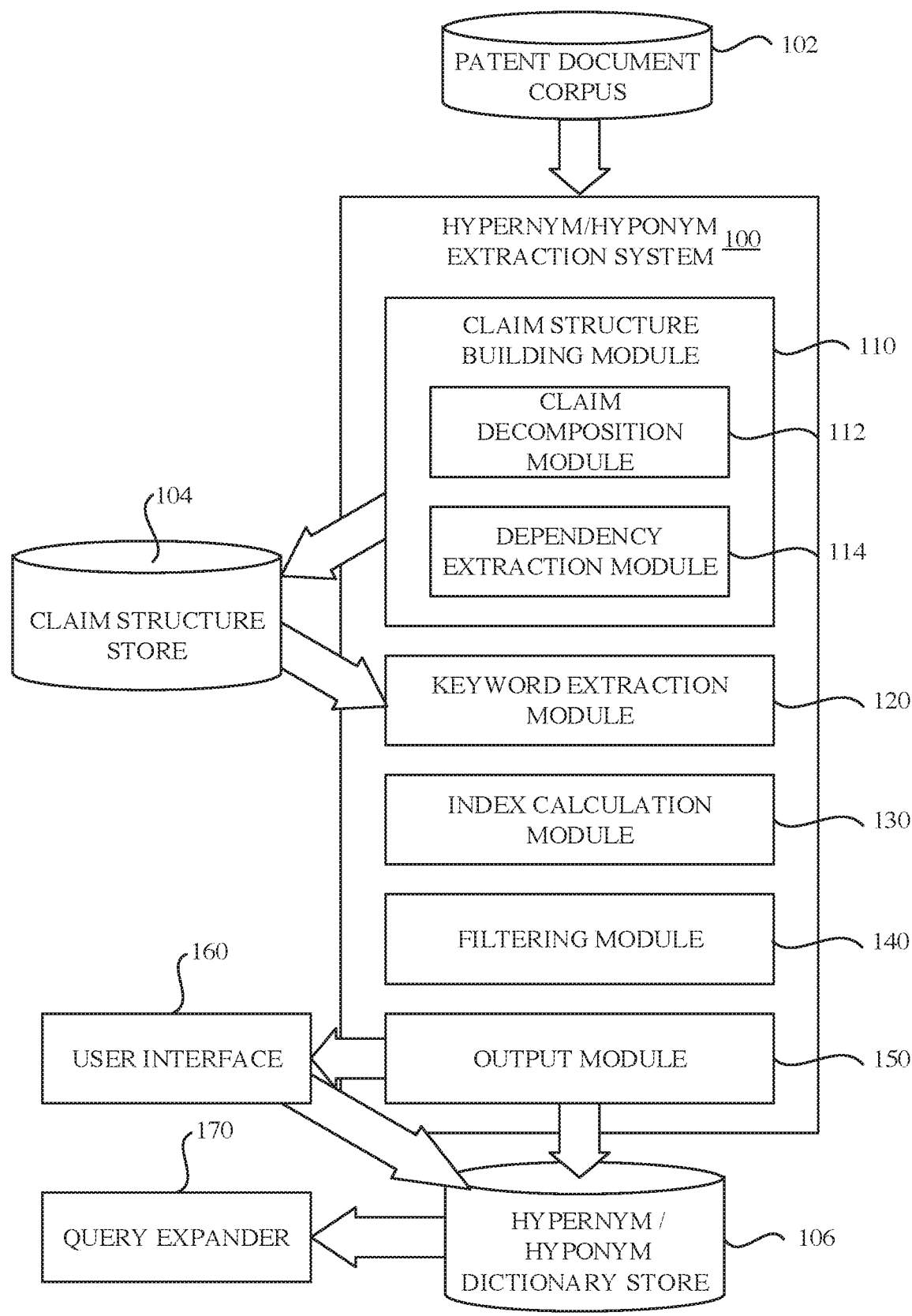
FIG. 1 illustrates a block diagram of a hypernym-hyponym extraction system for extracting hypernym-hyponym relation from a corpus of patent documents according to an exemplary embodiment of the present invention.

FIG. 1 illustrates a block diagram of a hypernym-hyponym extraction system (hereinafter, simply referred to as "extraction system") 100. In FIG. 1, there are the extraction system 100; a patent document corpus 102 from which the extraction system 100 reads patent documents; and a hypernym-hyponym dictionary store 106 to which a keyword pair having hypernym-hyponym relation extracted by the extraction system 100 is stored.

As shown in FIG. 1, the extraction system 100 includes a claim structure building module 110 that builds data structures representing claims from patent documents in the patent document corpus 102; a keyword extraction module 120 that extracts keywords based on the data structures; an index calculation module 130 that calculates a statistical index for each keyword pair; a filtering module 140 that performs filtering of the keyword pairs using the statistical index; and an output module 150 that outputs a filtered keyword pair as a candidate of a hypernym-hyponym relation.

The patent document corpus 102 is configured to store a collection of patent documents, each of which includes at least a patent claim section of a patent specification of a given patent or patent application. The patent document corpus 102 is stored on a storage device, such as RAM (Random Access Memory), HDD (Hard Disk Drive), SSD (Solid State Drive), etc. The document corpus 102 may include scanned versions of hard-copy (e.g., paper copies) documents as well as documents originating in digital formats. In the case of paper copies of the documents, scanning devices, such as peripheral 24 (FIG. 11) can be employed to scan the document to transform the document into electronic formats. Scanning technologies, such as optical character recognition (OCR), may be applied to the document either during or after scanning of the document by the scanning device to create, for example, a portable document format (PDF) version or other format versions of the document with machine-encoded text.

The patent claim section includes recitations of one or more patent claims. In a case that plural claims are included in the patent claim section, there may be two types of patent claims; an independent claim, which is standalone type and is directed to essential features of an invention, and a dependent claim, which depends on a single claim or on several claims and adds further limitation on the patent claim(s) followed by the dependent claim. The patent claim defines the scope of the protection given by the granted patent or sought in the patent application.

The claim structure building module 110 is configured to parse each patent document to obtain a plurality of hierarchal structures that originates from the patent documents in the patent document corpus 102. Each hierarchal structure includes a plurality of claim elements having respective recitations that are included in a corresponding patent document and represents dependency within the claim elements. Each hierarchal structure represents dependency between the claim elements in a single patent claim or dependency between the claim elements in a series of an independent claim and one or more dependent claims. When the patent document includes two or more independent claims, two or more hierarchal structures would be obtained. Note that the claim element corresponds to a part that can be decomposed from a single patent claim, or an entire patent claim. Hereinafter, the hierarchal structure is referred to as a claim structure.

FIG. 1 shows a more detailed diagram of the claim structure building module 110. The claim structure building module 110 may include a claim decomposition module 112 that decomposes each patent document into one or more claim elements; and a dependency extraction module 114 that extracts dependency within the claim elements.

The claim decomposition module 112 is configured to decompose one or more patent claims recited in each patent document into a plurality of claim elements. As described above, each claim element in the claim structure represents a part of a patent claim or an entire patent claim. The independent claim is preferable to be decomposed into a plurality of claim elements since the independent claim generally includes a plurality of limitations necessary to define an invention. The dependent claim itself can be treated as a claim element since the dependent claim often includes a limitation relating to only a single antecedent in the claim followed by the dependent claim. Alternatively, the dependent claim can be decomposed into a plurality of claim elements since the dependent claim often includes limitations relating to two or more antecedents recited in the claim followed by the dependent claim. The decomposition can be done by using any known technique, including using cue phrases, using line breaks or other structure extraction method.

The dependency extraction module 114 is configured to extract dependencies between the decomposed claim elements to build a claim structure. By performing the dependency extraction, the claim structure that has the decomposed claim elements and the extracted dependencies as nodes and edges, respectively, are built. Thus, a parent-child relationship may be defined between claim elements. The dependencies to be extracted includes a dependency between claim elements in one patent claim as well as a dependency between a claim element in one patent claim and a claim element in another patent claim or another patent claim itself. The depth for each element is calculated by a known algorithm and the parent-child relationship is identified by using an overlapping term that connects element-element dependency or element-dependent claim dependency.

As shown in FIG. 1, there is a claim structure store 104. The claim structure building module 110 is configured to store the built claim structure into the claim structure store 104. The claim structure store 104 is provided by the storage device, such as RAM, HDD, SSD, etc. In the described embodiment, the claim structures stored in the claim structure store 104 are described as being extracted by the claim structure building module 110 in the extraction system 100. However, the claim structures stored in the claim structure store 104 may not be limited and may include a claim structure extracted by another module outside of the extraction system 100.

The keyword extraction module 120 is configured to extract, for each parent-child relationship between one parent element and one child element in the claim structures, a parent keyword list from the parent element and a child keyword list from the child element. The keyword extraction can be done by using any known keyword extraction technique, including TF-IDF (Term Frequency-Inverse Document Frequency), BM25, TexRank approaches, etc.

Note that, in the described embodiment, the parent-child relationship is employed to prepare pairs of the parent and child keyword lists. However, in other embodiment, certain ancestor-descendant relationships such as grandparent-grandchild relation may also be contemplated. Also note that the keyword in the keyword list may be a single word or concatenated multiple words and may include a so-called key phrase. A stop word removal may be performed to exclude common words such as "is", "of", "a", etc. from the keywords. Also, lemmatization and/or stemming may also be performed before the keyword extraction.

More specifically, the keyword extraction module 120 may read the claim structures stored in the claim structure store 104 and extract, for each parent-child relationship in the claim structures, one or more parent keywords from the recitation of the parent element and one or more child keywords from the recitation of the child element to have the parent keyword list and the child keyword list. One keyword in the parent keyword list and one keyword in the child keyword list may be combined to enumerate an instance of a pair of parent and child keywords. The ways of extracting the parent and child keyword lists from the parent and child elements will be described in more detail later.

The index calculation module 130 is configured to calculate, for each pair of the parent and child keywords, a statistical index that indicates strength of association between the parent and child keywords, using pairs of the parent and child keyword lists that are obtained from the collection of the patent documents in the patent document corpus 102.

Also note that the patent documents to be analyzed can be limited by designation of an attribute, which may include an IPC (International Patent Classification) symbol. For example, a collection of patents having a specific IPC symbol prefix is designated to be analyzed. Thus, the pairs of the parent and child keyword lists used by the index calculation module 130 may be obtained from the collection of the patents having the specific IPC symbol prefix in the patent document corpus 102.

In a particular embodiment, the statistical index is, but not limited to, a pointwise mutual information (PMI) that measures an association of an event where the parent keyword appears in recitation of the parent elements (or the parent keyword lists) and an event where the child keyword appears in the child elements (or the child keyword lists).

The filtering module 140 is configured to filter the pairs of the parent and child keywords extracted by the keyword extraction module 120 using the statistical index that is calculated by the index calculation module 130. The output of the filtering module 140 is used to create a candidate list of keyword pairs having a hypernym-hyponym relationship. If a pair has a statistical index higher than a predetermined threshold, the pair remains in the resultant candidate list. Otherwise, the pair is discarded from the resultant candidate list.

In embodiments, additional filtering and/or evaluation can be performed to improve reliability and robustness of the resultant candidate list.

In an embodiment, the filtering module 140 may be further configured to determine whether or not each keyword pair also has a reverse relationship. The existence of the reverse relationship can be identified by confirming whether or not a statistical index calculated for a reverse pair (the parent and the child of the original pair are treated as a child and a parent of a reverse pair) is higher than a predetermined threshold. The keyword pair having the reverse relationship may be removed from the resultant candidate list of the keyword pairs (as an additional filtering) or flagged to notify that the paired keywords may have a bidirectional relationship (as an additional evaluation).

In further embodiments, the filtering module 140 may be further configured to add several flags to each keyword pair in the candidate list to indicate the reliability of each keyword pair in the candidate list (as additional evaluations). More detail about the flags will be described later.

The output module 150 is configured to output the candidate list of the keyword pairs having the hypernym-hyponym relationship based on the result of the filtering module 140 that uses the statistical index calculated for each pair to perform the filtering and/or evaluation.

The remaining keyword pairs in the candidate list may be stored in the hypernym-hyponym dictionary store 106 directly. Alternatively, a part or whole of the remaining keyword pairs that may be confirmed by an operator manually can be stored in the hypernym-hyponym dictionary store 106.

As shown in FIG. 1, the extraction system 100 may further include an user interface 160. The user interface 160 is configured to display the candidate list of the keyword pairs as the result of the hypernym-hyponym relation extraction, and receive an instruction from the operator designating an item to be stored as a hypernym-hyponym pair from among the candidates listed. Note that the user interface 160 can display a part of the candidate list involving a specific parent keyword (e.g., hypernym). The user interface 160 will be described in more detail later.

As a result of the hypernym-hyponym relation extraction, a plurality of hypernym-hyponym pairs may be registered in the hypernym-hyponym dictionary store 106. In FIG. 1, a query expander 170 is shown as an example of a use case, where the query expander 170 may perform a query expansion task by using the dictionary stored in the hypernym-hyponym dictionary store 106 to improve retrieval performance in patent analysis.

In particular embodiments, each of the modules 110, 120, 130, 140 and 150 in the extraction system 100 described in FIG. 1 and the submodule 112, 114 of the claim structure building module 110, as well as the user interface 160 and the query expander 170 may be implemented as software modules, including program instructions and/or data structures in conjunction with hardware components, such as a processing circuitry (e.g., a CPU (Central Processing Unit), a processing core, a GPU (Graphic Processing Unit), a FPGA (Field Programmable Gate Array)), a memory, etc.; as a hardware module including electronic circuitry (e.g., a neuromorphic chip); or as a combination thereof.

These modules 110, 112, 114, 120, 130, 140, 150, 160 and 170 described in FIG. 1 may be implemented on a single computer system such as a personal computer and a server machine, or a computer system distributed over a plurality of computing devices such as a computer cluster of computing nodes, a client-server system, a cloud computing system, an edge computing system, etc.

Figure 2:
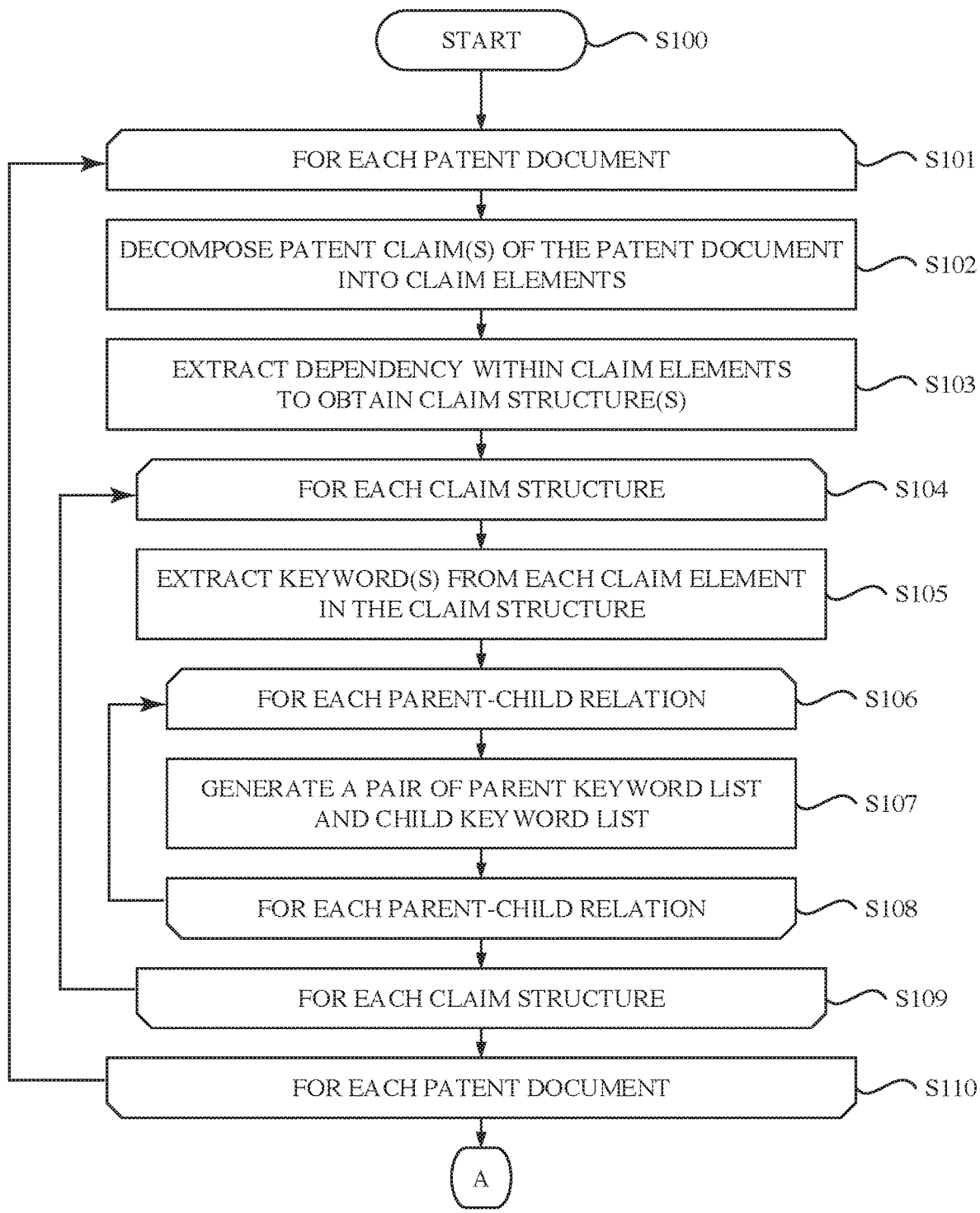
FIG. 2 is a first half of a flowchart depicting a process for extracting hypernym-hyponym relation from a corpus of patent documents according to an exemplary embodiment of the present invention.
Figure 3:
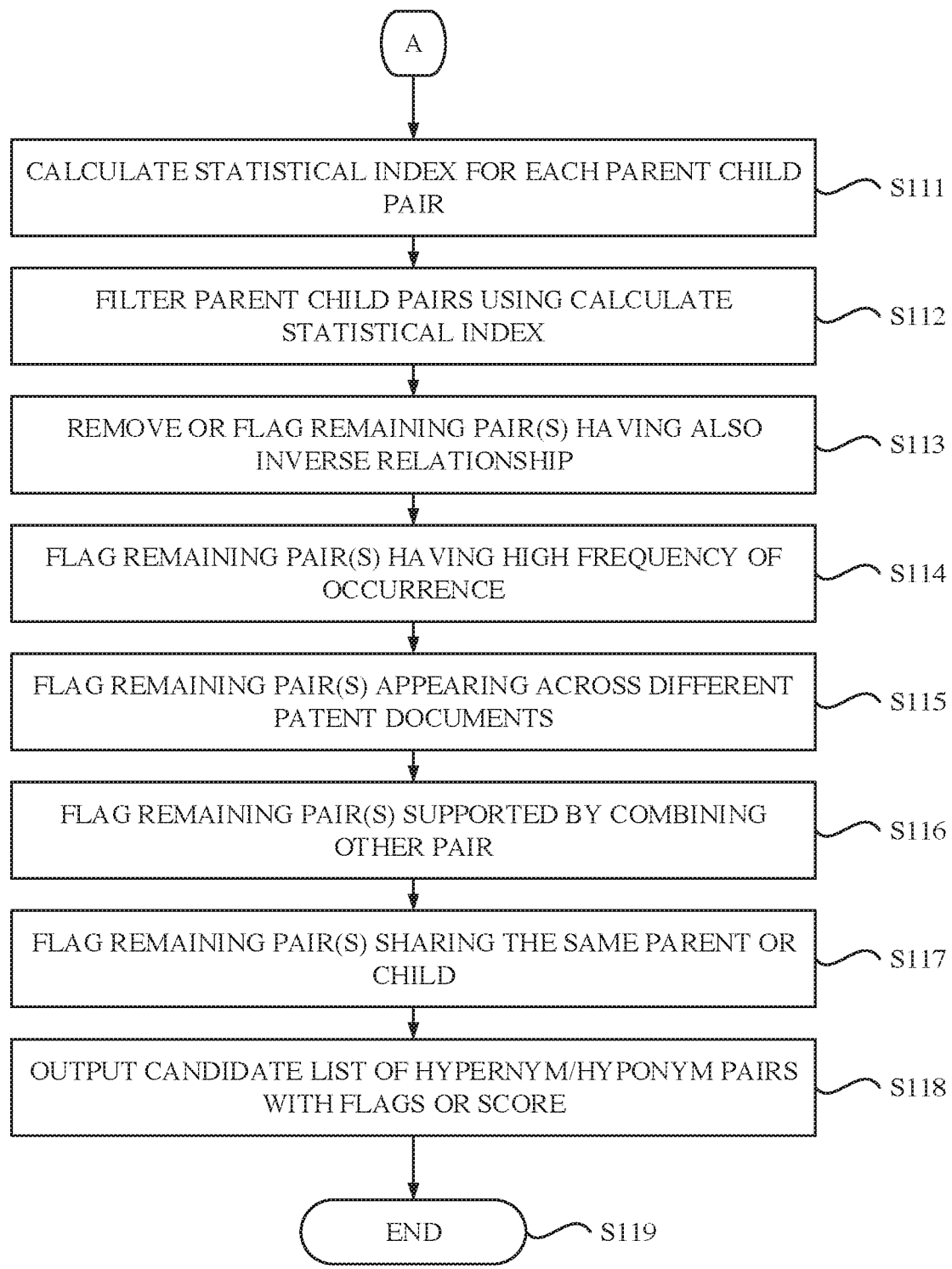
FIG. 3 is a latter half of the flowchart depicting the process for extracting the hypernym-hyponym relation from the corpus of the patent documents according to the exemplary embodiment of the present invention.

With reference to FIG. 2 and FIG. 3, a process for extracting hypernym-hyponym relation from a corpus of patent documents according to an exemplary embodiment of the present invention is described. Note that the process shown in FIG. 2 and FIG. 3 may be performed by processing circuitry such as a processing unit that implements the modules of the extraction system 100 described in FIG. 1.

As shown in FIG. 2, the process may begin at step S100 in response to calling the hypernym-hyponym relation extraction process. The process from block S101 to block S110 may be repeatedly performed for each patent document in the patent document corpus 102. Note that the request of the hypernym-hyponym relation extraction may have an attribute that designates the document to be analyzed. Such an attribute may include anIPC (International Patent Classification) symbol that is a uniform patent classification system to classify the content of the patents in a hierarchical manner. Such designation of the attribute may be done by using regular expression, including forward match, exact match, etc. For example, a collection of patents having a specific IPC symbol prefix may be designated for analysis.

FIG. 4 depicts an example of a series of patent claims as an input for the hypernym-hyponym relation extraction. Note that the example shown in FIG. 4 is an English translation of a part of the patent claim section in Japanese Patent Laid-open Publication No. 2015-88333. In the patent claim section 200, there are six claims, including a series of an independent claim 1 and four dependent claims 3-6 that depend from claim 1, which are focused on in this example for convenience. Note that a series of the independent claim 2 and its dependent claims are outside the range of consideration for convenience.

Referring back to FIG. 2, at block S102, the processing circuitry may decompose one or more patent claims recited in each patent document of the patent document corpus 102 into a plurality of claim elements. At block S103, the processing circuitry may extract dependencies between the claim elements to form one or more claim structures.

By performing the process of block S102 and block S103 for each patent document, a plurality of claim structures originating from the patent document corpus 102 are obtained. Each claim structure includes the plurality of the claim elements having respective recitations that are included in a corresponding patent document, and represents dependency of the claim elements.

Figure 5:
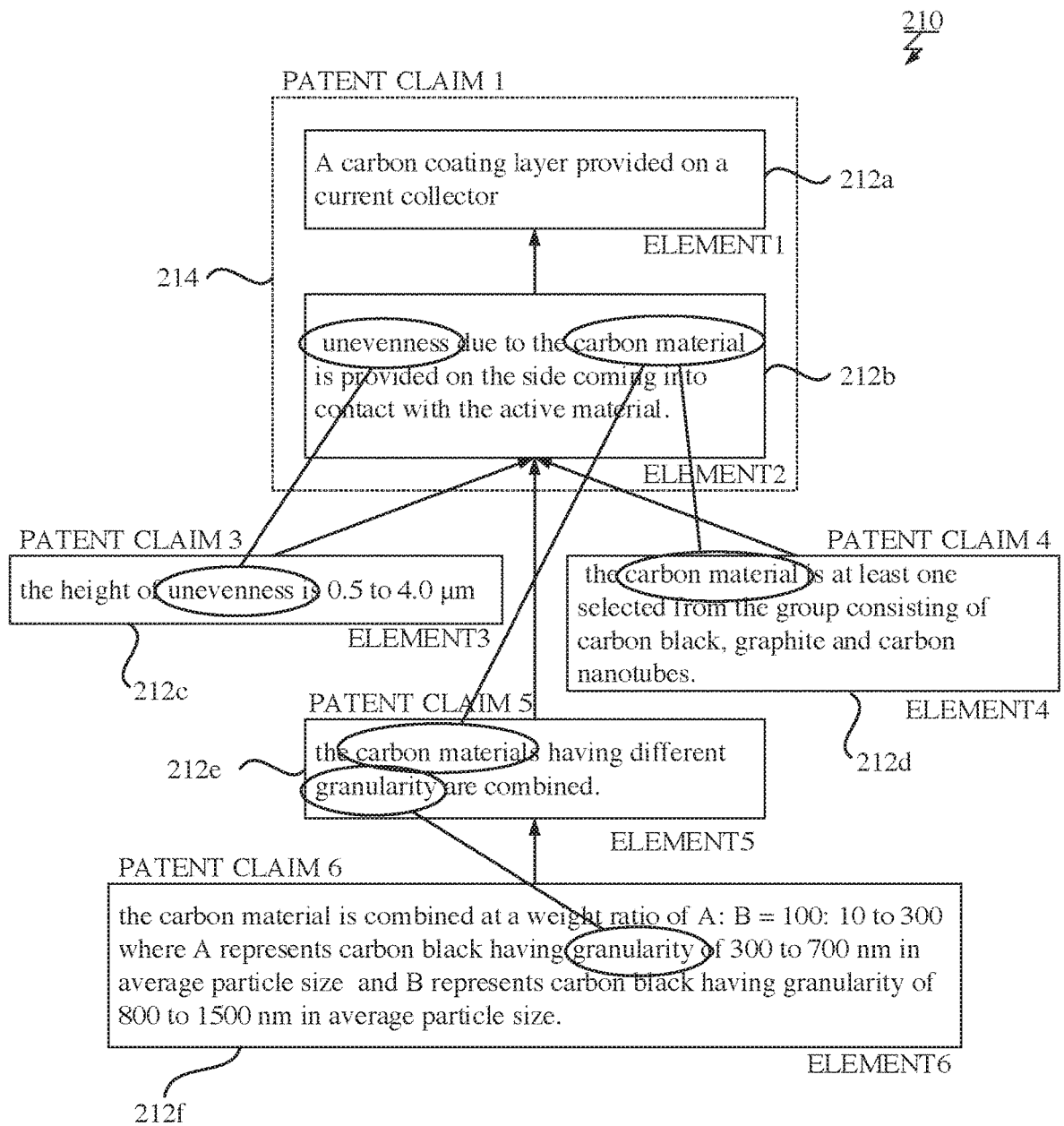
FIG. 5 depicts a schematic of way of building a claim structure as an intermediate data structure in the hypernym-hyponym extraction according to the exemplary embodiment of the present invention.

FIG. 5 depicts a schematic of a way of building a patent claim structure as an intermediate data structure in the process of the hypernym-hyponym relation extraction. In FIG. 5, there is a claim structure 210 that includes a six claim element 212a-212f. The claim structure 210 shown in FIG. 5 corresponds to the example of the series of the patent claims shown in FIG. 4. In FIG. 4 and FIG. 5, the overlapping keyword that connects parent and child elements is encompassed by a circle with a connecting line.

The two claim elements 212a, 212b (ELEMENT 1 and 2) are decomposed from the independent patent claim 1, as indicated by a dash box 214. The remaining claim elements 212c-212f (ELEMENTS 3-6) correspond to dependent claims (PATENT claims 3-6). There is a dependency between the claim element 212b of the independent patent claim 1 (ELEMENT 2) and the claim element 212c of the dependent claim 3 (ELEMENT 3). Also, there are dependencies between the claim element 212b (ELEMENT 2), and the claim element 212d of the dependent claim 4 (ELEMENT 4) and the claim element 212e of the dependent claim 5 (ELEMENT 5), respectively. Furthermore, there is a dependency between the claim element 212e of the dependent claim 5 (ELEMENT 5) and the claim element 212f of the dependent claim 6 (ELEMENT 6). As illustrated in FIG. 5, the claim structure 210 has a tree like structure including a plurality of claim elements having respective recitations as nodes and parent-child relation between a pair of parent and child elements as an edge.

Referring back to FIG. 2, the loop from block S104 to block S109 are repeatedly performed for each claim structure 210 originating from the patent document corpus 102.

At block S105, the processing circuitry may extract a keyword list from the recitation of each claim element. For example, a keyword list including "unevenness", "carbon material", "contact" and "active material" may be extracted from the recitation of the claim element 212b (of FIG. 5) of the independent patent claim 1 (ELEMENT 2). A keyword list including "height", "unevenness" and "µm" may be extracted from the claim element 212c of the dependent claim 3 (ELEMENT 3). During the keyword extraction, stop word removal, lemmatization and/or stemming may also be performed. By performing the process of block S105 for each claim element of the claim structure, a keyword list is obtained for each claim element of the claim structure.

The loop from block S106 to block S108 are repeatedly performed for each parent-child relation in each claim structure.

At block S107, the processing circuitry generates a pair of a parent keyword list and a child keyword list for the parent-child relation by using the keyword lists originally extracted from the elements involved in the parent-child relation.

In order to prepare the pair of the parent keyword list and the child keyword list, additional extraction from the original keyword list may be performed depending on whether the element is treated as either a parent or child element in the parent-child relation. For each parent-child relation, a parent keyword list and a child keyword list are finally extracted from the recitations of the parent and child elements, respectively.

There are mainly two methodologies of extracting the parent keyword list. In the first methodology, the parent keyword list can be extracted so as to have only a keyword overlapping with one in the child element. In the second methodology, the parent keyword list may be extracted so as to have every keyword regardless of whether it overlaps with one in the child element or not. In both methodologies, the child keyword list may be extracted so as to have a keyword that does not overlap with one in the parent element. After obtaining the parent and child keyword lists, one in the parent keyword list and one in the child keyword list can be combined to enumerate an instance of a pair of parent and child keywords.

FIG. 6 depicts schematics of methodologies for extracting parent and child keywords from recitations of the claim elements. In FIG. 6, there are four pairs of parent and child keyword lists for respective parent-child relations for each of two methodology (methodology-1 and methodology-2).

For the parent child relation between the claim element 212b (ELEMENT 2) and the claim element 212c (ELEMENT 3), there are a first keyword list 601a including "carbon material", "unevenness", "active material" and "contact" and a second keyword list 603a including "unevenness", "height" and "µm".

Among the keywords in the first keyword list 601a, only an overlapping keyword "unevenness" is extracted as a parent keyword by the first methodology (methodology-1). Among the keywords in the second keyword list 603a, only non-overlapping keywords "height" and "µm" are extracted as child keywords.

On the other hand, in the second methodology (methodology-2), among the keywords in the first keyword list 601b, all of overlapping and non-overlapping keywords "carbon material", "unevenness", "active material" and "contact" are extracted as parent keywords. Among the keywords in the second keyword list 603b, only non-overlapping keywords "height" and "µm" are extracted as the child keywords.

By performing the process from block S101 to block S110 (FIG. 2) for each patent document in the patent document corpus 102, a huge amount of the pairs of the parent and child keyword lists is prepared from the patent document corpus 102. In a particular embodiment, document identification (ID) may be given for each pair of the parent and child keyword lists. After exiting the loop from block S101 to block S110 (also the loop from block S104 to block S109 and the loop from block S106 to block S108), the process proceeds to block S111, shown on FIG. 3.

At block S111, the processing circuitry calculates, for each pair of the parent and child keywords, a statistical index that indicates strength of association between the parent and child keywords, using the huge amount of the pairs of the parent and child keyword lists obtained from in the patent document corpus 102. In a particular embodiment, the PMI (pointwise mutual information) can be used as the statistical index.

PMI for a pair of a parent keyword w1 and a child keyword w2 can be calculated as follows:

$$PMI(p=w1, c=w2) = \log\frac{P(p=w1, c=w2)}{P(p=w1) * P(c=w2)},$$

where P (p=w1) represents the probability that the keyword w1 appears in the recitation of the parent element, P (c=w2) represents the probability that the keyword w2 appears in the recitation of the child element, and P (p=w1, c=w2) denotes the probability that the keyword w1 appears in the parent element and the keyword w2 appears in its child element.

P (p=w1) can be calculated using a collection of parent keyword lists. P (c=w2) can be calculated in the same manner as P (p=w1). The claim element that is involved in one relationship as the child and also involved in another relationship as the parent is counted for both collections as one sample. P (p=w1, c=w2) can be calculated using a collection of pairs of the parent and child keyword lists.

At block S112, the processing circuitry may filter the parent and child keyword pairs using the statistical index to have meaningful candidate list of the keyword pairs. If a parent and child keyword pair (p=w1, c=w2) has statistical index higher than a predetermined threshold (k), e.g., PMI (p=w1, c=w2)>k, the parent and child keyword is maintained in the candidate list of the keyword pairs (e.g., a score S (p=w1, c=w2) is set to be PMI (p=w1, c=w2)). Otherwise, the parent and child keyword pair is discarded from the candidate list of the keyword pairs (e.g., the score S (p=w1, c=w2) is set to be zero (0) and the keyword pair with the score of 0 is ignored).

At block S113, the processing circuitry may remove or flag the remaining pairs by determining whether or not each keyword pair also has a reverse relationship using a predetermined threshold (t), which is a positive parameter. IF S (p=w2, c=w1)>t, the pair is removed (e.g., the score S(p=w1,c=w2) is set to be 0) from the candidate list or flagged in the candidate list.

If PMI is used as the statistical index, most of the noises may come from low frequent keyword pairs. Therefore, in the described embodiment, several flags that represent information relating to the reliability of the statistical index derived in block S111 are prepared.

At block S114, the processing circuitry may further flag the remaining pairs by determining whether or not each keyword pair has a high frequency of co-occurrences. Those pairs having a high frequency count #(p=w1, c=w2) are flagged, where #(p=w1, c=w2) denotes a count or frequency of the observation that the keyword w1 appears in the parent element and the keyword w2 appears in its child element.

At block S115, the processing circuitry may further flag the remaining pairs by determining whether or not each keyword pair has appeared across multiple different patent documents. Those pairs arising from different patent documents are flagged. It is based on the hypothesis that those pairs that appear in more than two different patents may be more reliable. Note that even from one patent the same pair may be extracted multiple times in extracting pairs. The document identification (ID) given for each pair of the parent and child keyword lists can be utilized.

At block S116, the processing circuitry may further flag the remaining pairs by determining whether or not each keyword pair has an indirect relationship via another keyword. Those pairs (p=w1, c=w2) in which there exists some w3 (where w3 denotes a third keyword) satisfying PMI (p=w1, c=w3)>s and PMI (p=w3, c=w2)>s even if the frequency count #(p=w1,c=w2) is small, are flagged. It is based on the hypothesis that a pair supported by combining other pairs (usually arising from different patents) is more reliable.

At block S117, the processing circuitry may further flag the remaining pairs by determining whether or not each keyword pair shares the same child or parent. Those pairs (p=w1, c=w2) in which there exists some w4 (where w4 denotes a fourth keyword) satisfying PMI (p=w1, c=w4)>s & PMI (p=w2, c=w4)>s are flagged. The w4 represents a shared child. Also, those pairs (p=w1, c=w2) in which there exists some w5 (where w5 denotes a fifth keyword) satisfying PMI (p=w5, c=w1)>s and PMI (p=w5, c=w2)>s are flagged. The w5 represents a shared parent. It is based on the hypothesis that if a pair shares the same child or parent, the relationship between the pair is related more closely.

At block S118, the processing circuitry outputs the candidate list of the keyword pairs having a hypernym-hyponym relationship based on the result of the filtering and the evaluations in which the statistical index calculated for each parent child keyword pair are used. Note that a whole or a part of the candidate list involving a specific parent keyword may be output. The process may end at block S119.

By specifying the values of the flags, only reliable pairs having high statistical scores may be selected. In other embodiment, by using the above-mentioned flags, some reliability scores may also be implemented.

With reference to FIG. 7, a graphical user interface displaying the result of the hypernym-hyponym relation extraction is described. The graphical user interface can be used for selecting more reliable pairs from candidates of hypernym/hyponym listed in the result.

In FIG. 7, there is a window 250 that includes a table 260 with scroll bar showing the candidate list of the keyword pairs as the result of the hypernym-hyponym relation extraction; a save button 252; and a cancel button 254.

The table 260 includes a plurality of columns 262a-262f and a plurality of rows 264a-264d representing candidate pairs. There are a selection column 262a, a hypernym column 262b that shows a hypernym in a corresponding candidate pair, a hyponym column 262c that shows a hyponym in the corresponding pair, a PMI column 262d that shows the value and magnitude of the PMI calculated for the corresponding pair, a multiple document flag column 262e, and a node share flag column 262f. In the selection column 262a, there is a checkbox for each row 264a-264d to receive an instruction from the operator designating the corresponding item to be stored as the hypernym-hyponym pair from among the candidate list. As shown in FIG. 7, rows 264c and 264d are selected and rows 264a and 264b are not selected, for example.

The multiple document flag column 262e may show a first flag (solid star) indicating that the corresponding keyword pair has appeared across multiple different patent documents or not. The node share flag column 262f may show a second flag (double circle) indicating that the corresponding keyword pair is supported by combining the other pairs. Those pairs (p=w1, c=w2) in which there exists some w3 satisfying PMI (p=w1, c=w3)>s & PMI (p=w3, c=w2)>s are flagged by the double circles. Furthermore, the node share flag column 262f may show a third flag (single circle) indicating that the corresponding keyword pair shares the same child or parent. Those pairs (p=w1 and c=w2) in which there exist some w4 satisfying PMI (p=w4, c=w1)>s and PMI (p=w4, c=w2)>s or there exist some w5 satisfying PMI (p=w5, c=w1)>s and PMI (p=w5, c=w2)>s are flagged by the single circles.

In response to the save button 252 being pressed down, the items designated using by the checkboxes are stored into the hypernym-hyponym dictionary store 106 as the hypernym-hyponym pair. In response to the cancel button 254 being pressed down, the obtained results are discarded.

According to one or more embodiments of the present invention, a novel technology capable of extracting semantic relations from a given corpus of documents is provided while reducing manual work by a human operator.

Generally, certain expression such as "is-a" expression can be used as a cue for identifying semantic relationships. However, such relationships are not always rigidly described in the form such as "is-a" expression in the patent documents. According to one or more embodiments of the present invention, semantic relations can be preferably extracted by the novel extraction process of the present invention, without relying on explicit and rigid expressions such as "is-a", since the novel extraction process can leverage certain hierarchical structure inherent in each document to extract the semantic relations.

The difficulty of the patent retrieval task may be due to the nature of the lexical gaps. Some of the lexical gaps arise from the mismatch of the "level". For example, there is a case that an application being analyzed is claiming a broad idea while the prior art is describing more concrete and specific ideas. In this case, it is preferable that the prior art describing more concrete and specific ideas are correctly retrieved in the prior art retrieval task. The candidate list of the keyword pairs having a semantic relationship can be used to expand a user's query to more correctly retrieve the target document that describes more concrete and specific ideas of the broad idea of the target query.

Note that in the aforementioned embodiments, the semantic relations to be extracted are described to be hypernym-hyponym relations and the corpus of the documents under analysis is described to be a corpus of patent documents including a patent claim section in a patent specification. However, the present invention is not limited to the aforementioned embodiments, and semantic relationships other than hypernym-hyponym relationships (e.g., "μm" as a more specific concept of "unevenness") can also be extracted. Although it is preferable that the corpus of the patent documents is employed as the document under analysis since the novel hypernym-hyponym extraction can leverage inherent characteristics of the patent claim sections in the patent specifications (where patent claims are natively built to describe hypernym-hyponym relationships) in some embodiments, however, using a corpus of documents other than patent documents may be envisioned.

Note that the languages to which the novel semantic relation extraction technique is applicable is not limited and such languages may include, but by no means limited to, Arabic, Chinese, English, French, German, Japanese, Korean, Portuguese, Russian, Spanish, for instance.

EXPERIMENTAL STUDIES

A program implementing modules 110, 120, 130, 140 and 150 of the extraction system 100 in FIG. 1 and the process shown in FIG. 2 and FIG. 3 according to the exemplary embodiment was coded and executed for a given corpus of patent documents. A collection of patent claim sections of Japanese patent publications (publications of unexamined patent applications or publications of granted patents if available) having IPC=H01M and filling dates during before 1999-2017 was prepared as the corpus of the patent documents, which corresponds to about 125,000 publications. The algorithm described in the literature (S. Suzuki, et al., "Extraction of Keywords of Novelties from Patent Claims", Proceedings of COLING 2016, the 26th International Conference on Computational Linguistics: Technical Papers, December 2016) was used to build the claim structures from each patent document in the given corpus. In order to calculate the statistical index, the relevance index (r) defined in IBM™ Watson® Explorer (WEX), which is almost identical to PMI with PMI (p=w1, c=w2)=log r (p=w1, c=w2), was employed. A collection of pairs of extracted parent and child keyword lists were used as input data for the WEX. The relevance index (r) was calculated by inputting each pair as one document into respective facets for the parent and child.

FIG. 8, FIG. 9 and FIG. 10 show three examples of candidate lists obtained from the given corpus using the first methodology (METHODOLOGY-1). Note that since the keyword pairs are written in Japanese, English translation is attached in the parentheses if necessary. As shown in FIG. 8, FIG. 9 and FIG. 10, it was demonstrated that plausible results can be obtained by the novel hypernym-hyponym extraction process from the given corpus of the patent documents.

Computer Hardware Component

Figure 11:
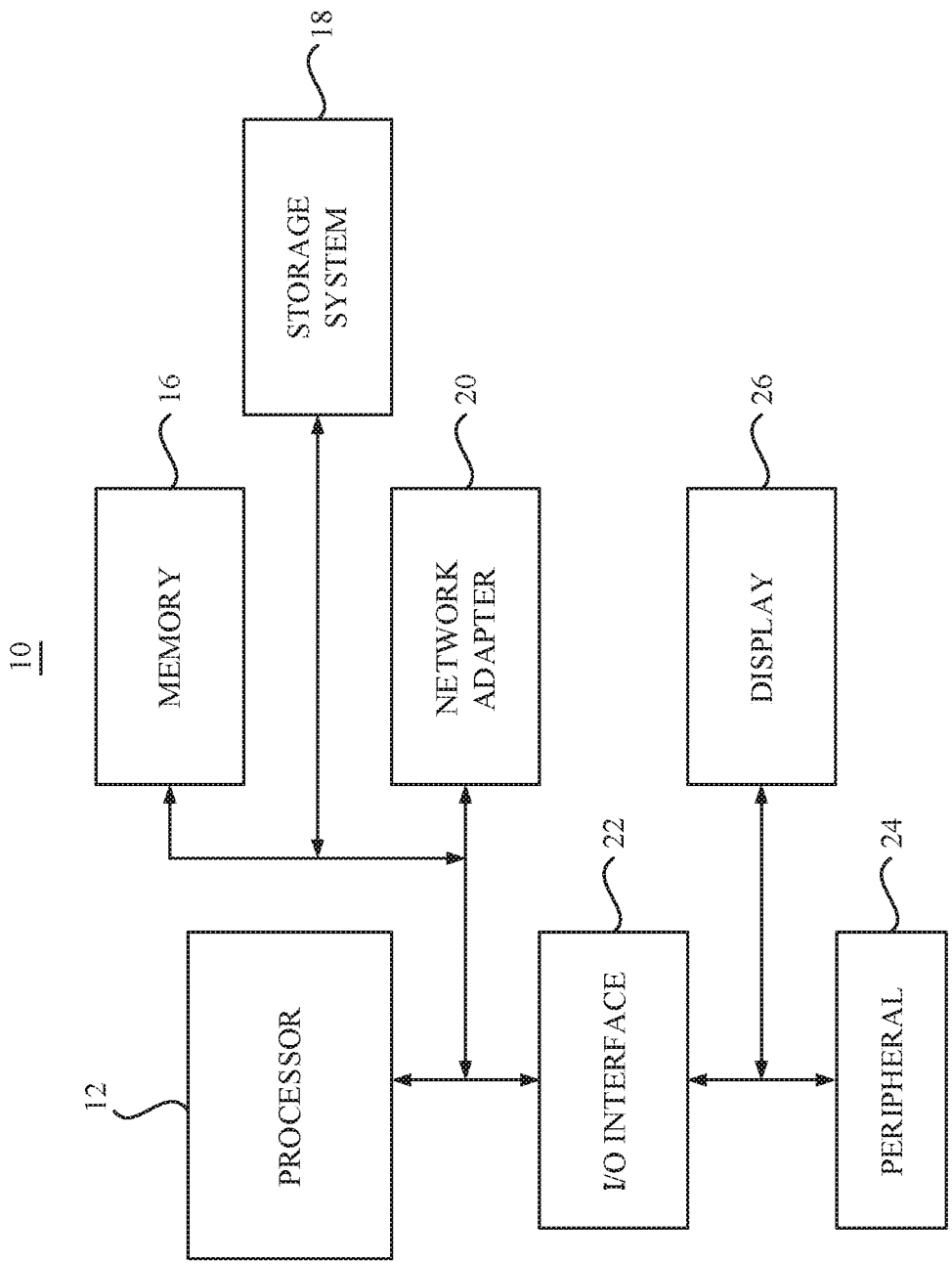
FIG. 11 depicts a computer system according to one or more embodiment of the present invention.

Referring now to FIG. 11, a schematic of an example of a computer system 10, which can be used for the extraction system 100, is shown. The computer system 10 is only one example of a suitable processing device, and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 11, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a document scanning device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Additionally, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via a bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for extracting semantic relations associated with patent claim elements, the method comprising:

generating a plurality of hierarchal structures originating from a plurality of patent claims recited in a corpus of free-form patent documents by extracting dependencies between a plurality of detected independent and dependent patent claim elements to generate extracted dependencies, each hierarchal structure including ancestor and descendant claim elements having respective recitations included in a corresponding patent document as nodes and the extracted dependencies as edges representative of the detected independent and dependent claim elements, respectively;

extracting, for each predetermined relationship between the ancestor and descendant claim elements in the hierarchal structures, one or more first keywords to generate a first keyword list from the ancestor claim element and one or more second keywords to generate a second keyword list from the descendant claim element, the second keyword list being extracted such that all keywords determined to be overlapping with the one or more first keywords are excluded from the second keyword list;

calculating, for each pair of first and second keywords, a statistical index indicating strength of association between the first and second keywords of the pair, using the first keyword lists and the second keyword lists, the calculating the statistical index comprising generating flags with specified values for pairs of interest from the each pair of first and second keywords for selection of reliable pairs having comparatively high statistical scores;

determining whether or not each keyword pair has a reverse relationship, the reverse relationship being identified by determining whether or not a determined statistical index for the reverse pair is higher than a predetermined threshold, wherein keyword pairs determined to have a reverse relationship are removed from a resultant candidate list of keyword pairs; and outputting a candidate list of keyword pairs having semantic hypernym-hyponym relationships, including filtering each pair of first and second keywords using the statistical index calculated for each pair of first and second keywords, wherein the first keyword list is generated from the ancestor claim element wherein a single overlapping keyword with a single keyword in the descendant claim element and the second keyword list is generated from the descendant claim element wherein a single non-overlapping keyword with the single keyword in the ancestor claim element.

2. The method of claim 1, wherein each hierarchal structure represents dependency between claim elements in a patent claim or dependency between claim elements in a series of an independent patent claim and one or more dependent patent claims depending from the independent patent claim, and each claim element in the hierarchal structure representing one patent claim or one claim element as a part of a patent claim.

3. The method of claim 1, wherein obtaining the plurality of hierarchal structures further comprises decomposing one or more patent claims recited in each patent document of the corpus of documents into the plurality of claim elements.

4. The method of claim 1, wherein one first keyword in the first keyword list and one second keyword in the second keyword list are combined to enumerate an instance of a pair of first and second keywords.

5. The method of claim 1, wherein the first keyword list is generated from the ancestor claim element so as to have one or more overlapping keywords with one in the descendant claim element and the second keyword list is generated from the descendant claim element so as to have one or more non-overlapping keywords with one in the ancestor claim element.

6. The method of claim 1, wherein the first keyword list is generated from the ancestor claim element so as to have one or more keywords regardless of overlapping with one in the descendant claim element and the second keyword list is generated from the descendant claim element so as to have one or more non-overlapping keywords with one in the ancestor claim element.

7. The method of claim 1, wherein each statistical index is a pointwise mutual information measuring an association of a first event where the first keyword of the pair appears in ancestor claim elements and a second event where the second keyword of the pair appears in descendant claim elements.

8. The method of claim 7, wherein the pointwise mutual information for a first keyword p=w1 and a second keyword c=w2 is calculated as $$\log\left(\frac{P(p=w1, c=w2)}{P(p=w1)*P(c=w2)}\right),$$

where P (p=w1) represents the probability that w1 appears in a given ancestor claim element, P (c=w2) represents the probability that w2 appears in a given descendent claim element, and P (p=w1, c=w2) denotes the probability that w1 appears in the given ancestor claim element and the keyword w2 appears in the given descendent claim element.

9. A computer system for extracting semantic relations associated with patent claim elements, by executing program instructions, the computer system comprising:
a memory tangibly storing the program instructions;
a processor in communications with the memory, wherein the processor is configured to:
generate a plurality of hierarchal structures originating from a plurality of patent claims recited in a corpus of free-form patent documents by extracting dependencies between a plurality of detected independent and dependent patent claim elements to generate extracted dependencies, wherein each hierarchal structure includes ancestor and descendant claim elements having respective recitations included in a corresponding patent document as nodes and the extracted dependencies as edges representative of the detected independent and dependent claim elements, respectively;
extract, for each predetermined relationship between the ancestor and descendant claim elements in the hierarchal structures, one or more parent keywords to generate a first keyword list from the ancestor claim element and one or more child keywords to generate a second keyword list from the descendant claim element, the second keyword list being extracted such that all keywords determined to be overlapping with the one or more first keywords are excluded from the second keyword list;
calculate, for each pair of first and second keywords, a statistical index indicating strength of association between the first and second keywords of the pair, using the first keyword lists and the second keyword lists, the calculating the statistical index comprising generating flags with specified values for pairs of interest from the each pair of first and second keywords for selection of reliable pairs having comparatively high statistical scores;
determine whether or not each keyword pair has a reverse relationship, the reverse relationship being identified by determining whether or not a determined statistical index for the reverse pair is higher than a predetermined threshold, wherein keyword pairs determined to have a reverse relationship are removed from a resultant candidate list of keyword pairs; and
output, to a display, a candidate list of keyword pairs having semantic hypernym-hyponym relationships by filtering each pair of first and second keywords using the statistical index calculated for each pair of first and second keywords,
wherein the first keyword list is generated from the ancestor claim element wherein a single overlapping keyword with a single keyword in the descendant claim element and the second keyword list is generated from the descendant claim element wherein a single non-overlapping keyword with the single keyword in the ancestor claim element.

10. A computer system for extracting semantic relations associated with patent claim elements, by executing program instructions, the computer system comprising:
a memory tangibly storing the program instructions;
a processor in communications with the memory, wherein the processor is configured to:
generate a plurality of hierarchal structures originating from a plurality of patent claims recited in a corpus of free-form patent documents by extracting dependencies between a plurality of detected independent and dependent patent claim elements to generate extracted dependencies, wherein each hierarchal structure includes ancestor and descendant claim elements having respective recitations included in a corresponding patent document as nodes and the extracted dependencies as edges representative of the detected independent and dependent claim elements, respectively;
extract, for each predetermined relationship between the ancestor and descendant claim elements in the hierarchal structures, one or more parent keywords to generate a first keyword list from the ancestor claim element and one or more child keywords to generate a second keyword list from the descendant claim element, the second keyword list being extracted such that all keywords determined to be overlapping with the one or more first keywords are excluded from the second keyword list;

calculate, for each pair of first and second keywords, a statistical index indicating strength of association between the first and second keywords of the pair, using the first keyword lists and the second keyword lists, the calculating the statistical index comprising generating flags with specified values for pairs of interest from the each pair of first and second keywords for selection of reliable pairs having comparatively high statistical scores;

determine whether or not each keyword pair has a reverse relationship, the reverse relationship being identified by determining whether or not a determined statistical index for the reverse pair is higher than a predetermined threshold, wherein keyword pairs determined to have a reverse relationship are removed from a resultant candidate list of keyword pairs; and output, to a display, a candidate list of keyword pairs having semantic hypernym-hyponym relationships by filtering each pair of first and second keywords using the statistical index calculated for each pair of first and second keywords, wherein the first keyword list is generated from the ancestor claim element so as to have a single overlapping keyword with a single keyword in the descendant claim element and the second keyword list is generated from the descendant claim element so as to have a single non-overlapping keyword with the single keyword in the ancestor claim element.

11. The computer system of claim 10, wherein each hierarchal structure represents dependency between claim elements in a patent claim or dependency between claim elements in a series of an independent patent claim and one or more dependent patent claims depending from the independent patent claim, and each claim element in the hierarchal structure representing one patent claim or one claim element as a part of a patent claim.

12. The computer system of claim 10, wherein the processor is further configured to decompose one or more patent claims recited in each patent document of the corpus of documents into the plurality of claim elements.

13. The computer system of claim 10, wherein the processor is further configured to:
determine (i) whether or not each keyword pair has a high frequency of co-occurrences, (ii) whether or not each keyword pair has appeared across multiple different documents, (iii) whether or not each keyword pair has an indirect relationship via another keyword and (iv) whether or not each keyword pair shares the same ancestor or descendent claim element.

14. The computer system of claim 10, wherein the first keyword list is generated from the ancestor claim element so as to have one or more overlapping keywords with one in the descendant claim element and the second keyword list is generated from the descendant claim element so as to have one or more non-overlapping keywords with one in the ancestor claim element.

15. The computer system of claim 10, wherein the first keyword list is generated from the ancestor claim element so as to have one or more keywords regardless of overlapping with one in the descendant claim element and the second keyword list is generated from the descendant claim element so as to have one or more non-overlapping keywords with one in the ancestor claim element.

16. The computer system of claim 10, wherein each statistical index is a pointwise mutual information measuring an association of a first event where the first keyword of the pair appears in ancestor claim elements and a second event where the second keyword of the pair appears in descendant claim elements.

17. A computer program product for extracting semantic relations associated with patent claim elements, the computer program product comprising a computer readable storage medium having program instructions embodied therewith, the program instructions executable by a computer to cause the computer to perform a method comprising:

generating a plurality of hierarchal structures originating from a plurality of patent claims recited in a corpus of free-form patent documents by extracting dependencies between a plurality of detected independent and dependent patent claim elements to generate extracted dependencies, each hierarchal structure including ancestor and descendant claim elements having respective recitations included in a corresponding patent document as nodes and the extracted dependencies as edges representative of the detected independent and dependent claim elements, respectively;

extracting, for each predetermined relationship between the ancestor and descendant claim elements in the hierarchal structures, one or more first keywords to generate a first keyword list from the ancestor claim element and one or more second keywords to generate a second keyword list from the descendant claim element, the second keyword list being extracted such that all keywords determined to be overlapping with the one or more first keywords are excluded from the second keyword list;

calculating, for each pair of first and second keywords, a statistical index indicating strength of association between the first and second keywords of the pair, using the first keyword lists and the second keyword lists, the calculating the statistical index comprising generating flags with specified values for pairs of interest from the each pair of first and second keywords for selection of reliable pairs having comparatively high statistical scores;

determining whether or not each keyword pair has a reverse relationship, the reverse relationship being identified by determining whether or not a determined statistical index for the reverse pair is higher than a predetermined threshold, wherein keyword pairs determined to have a reverse relationship are removed from a resultant candidate list of keyword pairs; and outputting a candidate list of keyword pairs having semantic hypernym-hyponym relationships, including filtering each pair of first and second keywords using the statistical index calculated for each pair of first and second keywords, wherein the first keyword list is generated from the ancestor claim element wherein a single overlapping keyword with a single keyword in the descendant claim element and the second keyword list is generated from the descendant claim element wherein a single non-overlapping keyword with the single keyword in the ancestor claim element.

18. The computer program product of claim 17, wherein each hierarchal structure represents dependency between claim elements in a patent claim or dependency between claim elements in a series of an independent patent claim and one or more dependent patent claims depending from the independent patent claim, and each claim element in the hierarchal structure representing one patent claim or one claim element as a part of a patent claim.

19. The computer program product of claim 17, wherein the method further comprises:

determining (i) whether or not each keyword pair has a high frequency of co-occurrences, (ii) whether or not each keyword pair has appeared across multiple different documents, (iii) whether or not each keyword pair has an indirect relationship via another keyword and (iv) whether or not each keyword pair shares the same ancestor or descendent claim element.

* * * * *